United States Patent [19]

Arnold et al.

[11] 4,045,409

[45] Aug. 30, 1977

[54] THERMALLY STABLE, HIGHLY FUSED IMIDE COMPOSITIONS

[75] Inventors: Fred E. Arnold, Centerville; Frederick L. Hedberg, Dayton, both of Ohio

[73] Assignee: The United States of America as represented by the Secretary of the Air Force, Washington, D.C.

[21] Appl. No.: 678,324

[22] Filed: Apr. 19, 1976

[51] Int. Cl.² .................... C08G 73/10; C08G 73/12
[52] U.S. Cl. .................... 260/49; 260/47 CP; 260/47 UA; 260/65; 260/78 TF; 260/78 UA
[58] Field of Search ............... 260/47 CD, 49, 78 TF, 260/63 N, 65, 47 UA, 78 UA

[56] References Cited

U.S. PATENT DOCUMENTS

| | | | |
|---|---|---|---|
| 3,555,071 | 1/1971 | Rao et al. | 260/453 |
| 3,879,349 | 4/1975 | Bilow et al. | 260/47 UA |
| 3,897,395 | 7/1975 | D'Alelio | 260/63 N |
| 3,926,913 | 12/1975 | Jones et al. | 260/47 CP |

*Primary Examiner*—Lester L. Lee
*Attorney, Agent, or Firm*—Joseph E. Rusz; Cedric H. Kuhn

[57] ABSTRACT

Thermally stable, highly fused imide polymers are prepared by reacting 2,2'-bis(phenylethynyl)-4,4'-diaminobiphenyl or 2,2'-bis-(phenylethynyl)-5,5'-diaminobiphenyl with an aromatic dianhydride. The polyimides are particularly suitable for use in high temperature applications, such as in the fabrication of fiber reinforced structural composites, fibrous materials and protective coatings.

12 Claims, No Drawings

THERMALLY STABLE, HIGHLY FUSED IMIDE COMPOSITIONS

RIGHTS OF THE GOVERNMENT

The invention described herein may be manufactured and used by or for the Government of the United States for all governmental purposes without the payment of any royalty.

FIELD OF THE INVENTION

This invention relates to thermally stable, highly fused imide compositions. In one aspect it relates to a process for preparing the imide compositions.

BACKGROUND OF THE INVENTION

Matrix and adhesive resins currently available for fabricating structural composites have certain limitations. Because of their poor thermooxidative stability and moisture sensitivity, aliphatic systems in general have limited use temperatures. While certain aromatic and aromatic-heterocyclic systems on the other hand are moisture insensitive, they are not completely satisfactory as a result of their poor processing parameters.

The primary processing problem inherent in a substantial number of aromatic-heterocyclic systems is the absence of an effective method for curing these systems. Aromatic and aromatic-heterocyclic systems are conventionally cured by interchain chemical reactions. This curing method requires high temperatures since extensive flow is mandatory. Because of their inherent rigidity, aromatic and aromatic-heterocyclic resins are much more susceptible to mobility dependence than are aliphatic resins. There is a need, therefore, for an entirely different method of cure that is not dependent upon extensive molecular mobility.

It is an object of this invention, therefore, to provide aromatic heterocyclic resins which can be cured by intramolecular reactions requiring only rotational movement of the polymer backbone.

Another object of the invention is to provide polyimides containing phenylethynyl pendant groups, which will cyclize and cure intramolecularly.

A further object of the invention is to provide a process for preparing the polyimides.

Other objects and advantages of the invention will become apparent to those skilled in the art upon consideration of the accompanying disclosure.

SUMMARY OF THE INVENTION

The present invention resides in an imide polymer which consists essentially of repeating units having the following formula:

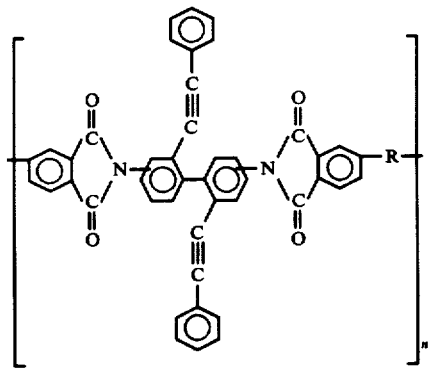

wherein the imido nitrogen atoms are connected to the 4,4' or the 5,5' positions of the biphenyl linkage containing the 2,2'-phenylethynyl groups, and wherein R is

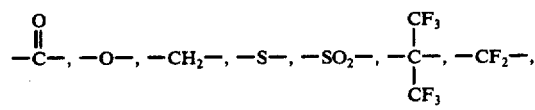

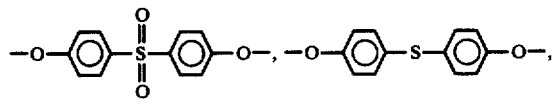

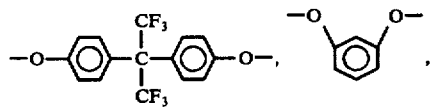

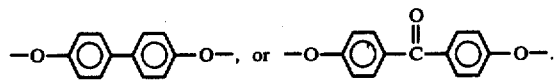

The letter $n$ in the formula is an integer indicating the number of repeating units and is generally at least 2 and preferably at least 4. In general, the number of repeating units is such that the polymer has an inherent viscosity of about 0.1 to 2.0 as measured in N,N'-dimethylacetamide at 30° C.

In one embodiment, the present invention resides in a process for preparing polyimides having the above structural formula. Thus, the polymers are synthesized by the condensation of 2,2'-bis(phenylethynyl)-4,4'-diaminobiphenyl or 2,2'-bis(phenylethynyl)-5,5'-diaminobiphenyl with an aromatic dianhydride. The condensation reaction involved is illustrated by the following equation:

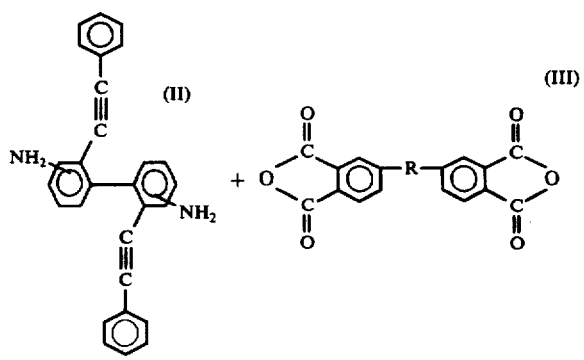

Acetic anhydride
Solvent
↓

Polymer of Formula (I)

In the above equation, R is as indicated hereinabove.

The condensation reaction illustrated by the above equation is conducted under an inert atmosphere in an aprotic solvent. Initially, the monomers are mixed at about room temperature for a period of about 12 to 36 hours, thereby forming a polyamic acid. At the end of this period, acetic anhydride is added to the reaction mixture which is then heated at about 120° to 140° C for about 1 to 2 hours. As a result of the acetic anhydride addition and the heating, the polyamic acid is cyclodehydrated to the polyimide.

Any suitable inert gas can be used in practicing the process. Examples of such gases include nitrogen, helium, argon, and the like. Exemplary aprotic solvents suitable for use include N,N'-dimethylformamide, N,N'-diethylformamide, N,N'-dimethylacetamide, N,N'-diethylacetamide, N-methyl-α-pyrrolidone, tetramethylurea, hexamethylphosphoramide, tetramethylene sulfone, and the like.

In synthesizing the polyimides of this invention as described above, the monomers are generally employed in equimolar amounts. While a slight excess of one of the monomers is not detrimental to the condensation reaction, a considerable excess results in the production of lower molecular weight products. The amount of acetic anhydride used in the process is that which is sufficient to provide about 20 to 150 percent, preferably about 30 to 50 percent, molar excess of the compound, based on the number of moles of either of the monomers.

In isolating the polymer product, the reaction mixture is cooled, e.g., to room temperature, at the end of the reaction period. The reaction mixture is then poured into a non-solvent for the polymer, such as an alcohol, thereby causing the polymer to precipitate from solution. After recovery of the polymer, as by filtration or decantation, it is washed, e.g., with an alcohol, and then dried at a temperature of about 60° to 100° C for a period of about 12 to 36 hours.

Examples of aromatic dianhydrides (Formula III) that can be used include 3,3',4,4'-benzophenonetetracarboxylic acid dianhydride, bis(3,4-dicarboxyphenyl)ether dianhydride, bis(3,4-dicarboxyphenyl)sulfone dianhydride, bis(3,4-dicarboxyphenyl)methane dianhydride, 2,2'-bis(3',4'-dicarboxyphenyl)hexafluoropropane dianhydride, bis[4-(3,4-dicarboxyphenoxy)phenyl]sulfone dianhydride, 2,2'[4-(3,4-dicarboxyphenoxy)phenyl]hexafluoropropane dianhydride, bis[4-(3,4-dicarboxyphenoxy)phenyl]sulfide dianhydride, and the like. The aromatic dianhydrides are well known compounds which are described in the literature.

The monomer represented by formula II above in which the amino groups are in the 4,4' positions of the biphenyl linkage, i.e., 2,2'-bis(phenylethynyl)-4,4'-diaminophenyl, is prepared by reacting copper phenylacetylide with 2,2'-diiodobenzidine in pyridine. The reaction involved can be represented by the following equation:

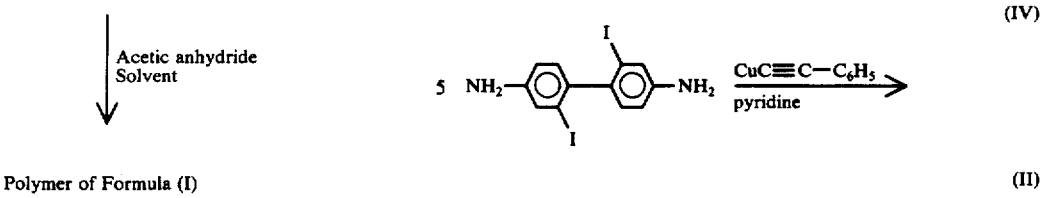

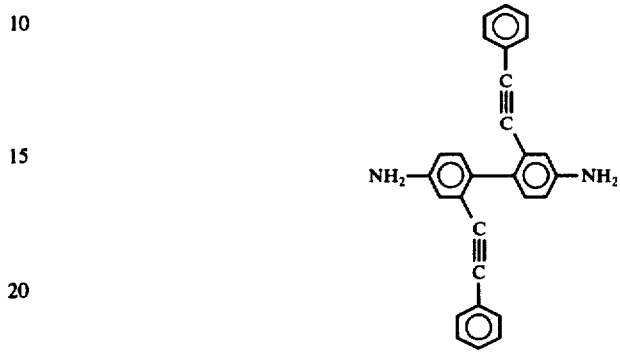

The monomer represented by formula II above in which the amino groups are in the 5,5' positions of the biphenyl linkage, i.e., 2,2'-bis(phenylethynyl)-5,5'-diaminophenyl, is prepared by a five-step reaction sequence. The reactions involved can be represented by the following equations:

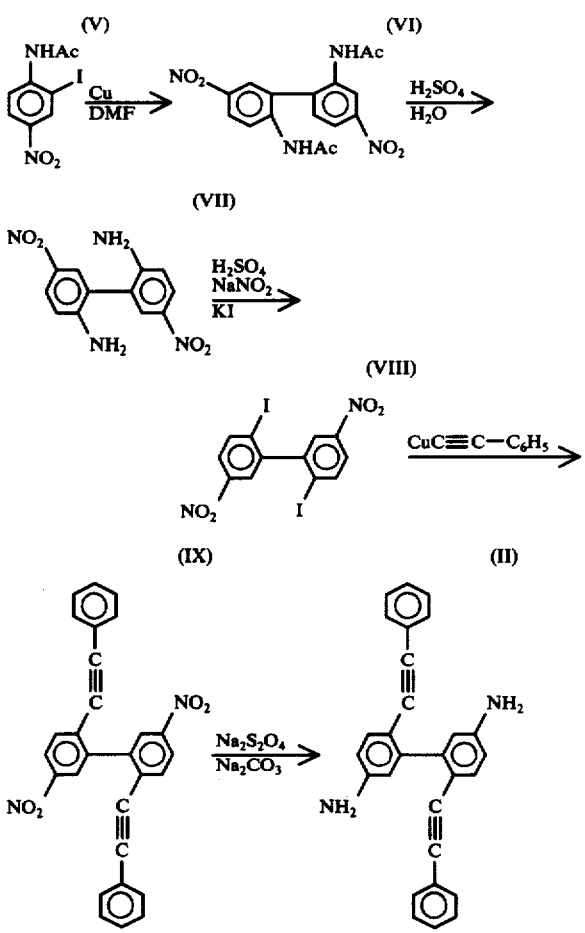

As shown by the above equations, initially 2-iodo-4-nitroacetanilide (V) is reacted in dimethylformamide (DMF) to give 2,2'-bis(acetamido)5,5'-dinitrobiphenyl (VI). The acetamide groups of compound (VI) are then hydrolyzed with sulfuric acid to give 2,2'-diamino-5,5'-dinitrobiphenyl (VII). Diazotisation of compound (VII) followed by reaction with potassium iodide in water gives 2,2'-diiodo-5,5'-dinitrobiphenyl (VIII). Compound (VIII) is reacted with copper phenylacetylide to give 2,2'-bis(phenylethynyl)-5,5'-dinitrobiphenyl (IX). In the final step, compound (IX) is reduced with a solution of sodium dithionite and sodium carbonate in a water-dioxane mixture to give compound (II). A more detailed discussion of the preparation of the monomers is contained in our copending U.S. patent application Ser. No. 678-325, filed on Apr. 17, 1976. The disclosure of our copending application is incorporated herein by reference.

The polyimides of formula (I) are cured by heating the polymer at a temperature in the range of about 200° to 250° F. A period of about 0.5 to 3 hours is usually sufficient to affect the cure although longer times, e.g., 24 hours and longer, can be employed. During the curing operation, pendant phenylethynyl groups on the polymer undergo an intramolecular cyclization reaction forming a bibenzoanthracene structure according to the following formula:

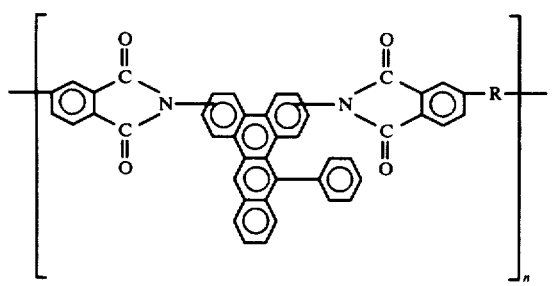

A more comprehensive understanding of the invention can be obtained by referring to the following illustrative examples which are not intended, however, to be unduly limitative of the invention.

EXAMPLE I

Poly[(1,3-dihydro-1,3-dioxo-2H-isoindole-5,2-diyl)[2,2'-bis(phenylethynyl)
[1,1'-biphenyl-5,5'-diyl](1,3-dihydro-1,3-dioxo-2H-isoindole-2,5-diyl)oxy-1,4-phenylenesulfonyl-1,4-phenyleneoxy]

A mixture of 2,2'-bis(phenylethynyl)-5,5'-diaminobiphenyl (0.292 g, 0.76 mmole) and bis[4-(3,4-dicarboxyphenoxy)phenyl]sulfone dianhydride (0.412 g, 0.76 mmole) was dissolved in 250 ml of dried (molecular sieves) N,N'-dimethylacetamide. The reaction mixture was stirred, under an atmosphere of dry nitrogen, at room temperature for 24 hours. Acetic anhydride (10 ml) was added to the reaction mixture and it was heated at 130° C for 1.5 hours. The reaction mixture was allowed to cool to room temperature and the polymer isolated by precipitation of the reaction mixture into 2 of methanol. The polymer after being washed with methanol, and dried at 80° C for 24 hours exhibited an inherent viscosity (0.5% solution in N,N'-dimethylacetamide at 30° C) of 0.11.

Analysis Calc'd for $(C_{56}H_{30}N_2O_8S)_n$: C,75.50; H,3.39; N,3.14; S,3.60. Found: C,75.55; H,3.25; N,3.05; S,3.40.

Analysis of the polymer by differential scanning calorimetry showed an exothermic reaction maximizing at 237° C. Prior softening of the polymer at 200°-225° C was indicated by both thermomechanical analysis and softening under-load measurements. After curing the polymer at 240°-250° C for 24 hours, a glass transition temperature (Tg) of 350°-360° C was measured by differential scanning calorimetry and softening-under-load.

EXAMPLE II

Poly[(1,3-dihydro-1,3-dioxo-2H-isoindole-5,2-diyl)[2,2'-bis(phenylethynyl)
[1,1'-biphenyl]-5,5'-diyl](1,3-dihydro-1,3-dioxo-2H-isoindole-2,5-diyl)oxy-1,4-phenylene[bis(trifluoromethyl)methylene]-1,4-phenyleneoxy]

A mixture of 2,2'-bis(phenylethynyl)-5,5'-diaminobiphenyl (0.172 g, 0.448 mmole) and 2,2'-bis[4-(3,4-dicarboxyphenoxy)phenyl]hexafluoropropane dianhydride was dissolved in 20 ml of N,N'-dimethylacetamide. The reaction mixture was stirred at room temperature under a nitrogen atmosphere for 24 hours. Acetic anhydride (10 ml) was added to the reaction mixture and it was heated to 130° C and maintained at that temperature for 1.5 hours. The solution was then cooled to 30° C and poured into 2 liters of methanol to precipitate the polymer. The precipitate was collected, washed with methanol, and then dried at 80° C for 24 hours. The polymer exhibited an inherent viscosity (0.5% solution in N,N'-dimethylacetamide at 30° C) of 0.30.

Analysis Calc'd for $(C_{59}H_{30}F_6N_2O_6)$: C,72.54; H,3.10; N,2.87. Found: C,71.52; H,3.13; N,2.93.

Analysis of the polymer by differential scanning calorimetry showed an exothermic reaction beginning at 165° C, increasing above 200° C and maximizing at 233° C. Thermomechanical analysis of the polymer showed softening at 185° C. After curing the polymer at 240°-250° C for 24 hours, a glass transition temperature (Tg) of 325° C was measured by differential scanning calorimetry.

EXAMPLE III

Poly[(1,3-dihydro-1,3-dioxo-2H-isoindole-5,2-diyl)[2,2'-bis(phenylethynyl)
[1,1'-biphenyl]-4,4'-diyl](1,3-dihydro-1,3-dioxo-2H-isoindole-2,5-diyl)oxy-1,4-phenylenesulfonyl-1,4-phenyleneoxy]

A mixture of 2,2'-bis(phenylethynyl)-4,4'-diaminobiphenyl (1.01 g, 2.63 mmoles) and bis[4-(3,4-dicarboxyphenoxy)phenyl]sulfone dianhydride (1.430 g, 2.63 mmole) was dissolved in 250 ml of N,N'-dimethylacetamide. The reaction mixture was stirred at room temperature, under a nitrogen atmosphere for 24 hours. Acetic anhydride (10 ml) was then added to the reaction mixture and it was heated at 130° C for 1.5 hours. After cooling, the reaction mixture was poured into 2 liters of methanol to precipitate the polymer which was washed with methanol and dried at 80° C for 24 hours. The dried polymer exhibited an inherent viscosity (0.5% solution in N,N'-dimethylacetamide at 30° C) of 0.45.

Analysis Calc'd for $(C_{56}H_{30}N_2O_8S)_n$: C,75.50; H,3.39; N,3.14; S,3.60. Found: C,75.16; H,3.13; N,2.72; S,3.86.

Analysis of the polymer by differential scanning calorimetry showed an exothermic reaction maximizing at 246° C corresponding to the intramolecular cycloaddition of the pendant phenylacetylene groups. No glass transition temperature (Tg) was observed for the polymer below the cycloaddition temperature. After curing the polymer at 240°-250° C for 24 hours, a Tg of 380° C was measured by differential scanning calorimetry.

The data in the foregoing examples demonstrate that the polyimides of this invention are cured at moderate temperatures by intramolecular reactions. During the curing process no volatile by-products are evolved, thereby eliminating the possibility of void formation. Thus, the polyimides are not subject to the disadvantages of conventional aromatic-heterocyclic systems which must be cured by interchain chemical reactions. Also, the data show that the polyimides on curing provide modified polymers with no softening point below their decomposition temperature. Because of their outstanding properties, the polyimides are particularly suitable for use in fabricating molded articles, e.g., by vacuum molding, such as fiber reinforced structural composites. The imide polymers can also be used in forming fibers and protective coatings by conventional methods.

As will be evident to those skilled in the art, modification of the present invention can be made in view of the foregoing disclosure without departing from the spirit and scope of the invention.

We claim:

1. A thermally stable imide polymer consisting essentially of repeating units having the following formula:

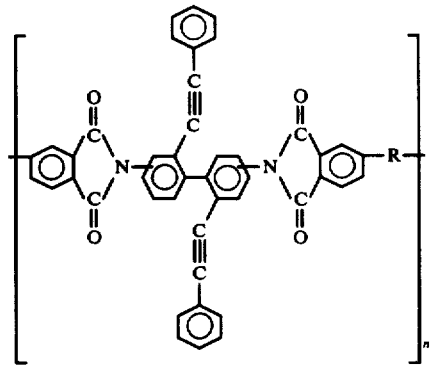

wherein the imido nitrogen atoms are connected to the 4,4' or the 5,5' positions of the biphenyl linkage containing the 2,2'-phenylethynyl groups, and wherein R is

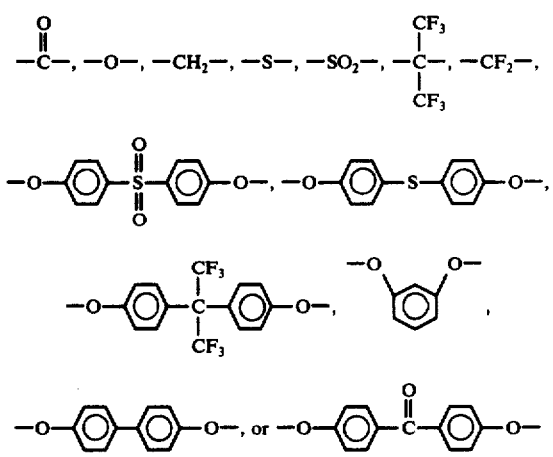

and n has a value such that the polymer has an inherent viscosity of about 0.1 to 2.0 as measured in N,N'-dimethylacetamide at 30° C.

2. The imide polymer according to claim 1 in which the imido nitrogens are connected to the 5,5' positions of the biphenyl linkage and wherein R is

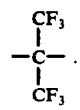

3. The imide polymer according to claim 1 in which the imido nitrogens are connected to the 5,5' positions of the biphenyl linkage and wherein R is

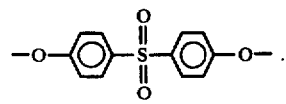

4. The imide polymer according to claim 1 in which the imido nitrogens are connected to the 4,4' positions of the biphenyl linkage and wherein R is

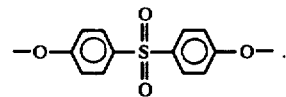

5. The imide polymer according to claim 1 in which the imido nitrogens are connected to the 4,4' positions of the biphenyl linkage, and wherein R is

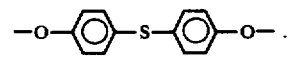

6. The imide polymer according to claim 1 in which the imido nitrogens are connected to the 4,4' positions of the biphenyl linkage, and wherein R is

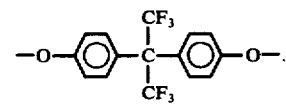

7. A process for preparing a thermally stable imide polymer which comprises the steps of mixing in an aprotic solvent selected from the group consisting of N,N'-dimethylformamide, N,N'-diethylformamide, N,N'-dimethylacetamide, N,N'-diethylacetamide, N-methyl-α-pyrrolidone, tetramethylurea, hexamethylphosphoramide, and tetramethylene sulfone at about room temperature equimolar amounts of (1) 2,2'-bis(-phenylethynyl)-4,4'-diaminobiphenyl or 2,2'-bis(-phenylethynyl)-5,5'-diaminobiphenyl and (2) an aromatic dianhydride having the following formula:

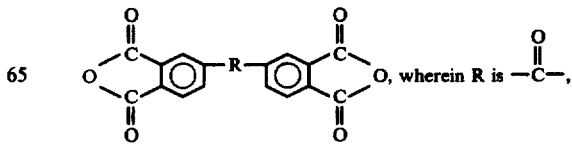

-continued

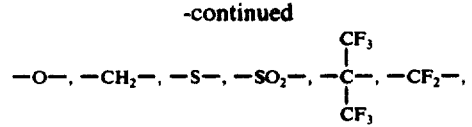

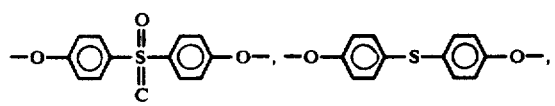

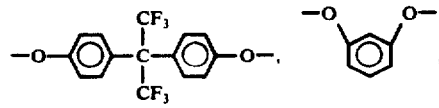

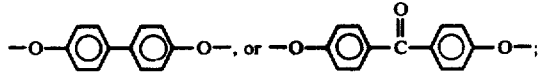

adding to the mixture about 20 to 150 percent molar excess of acetic anhydride, based on the number of moles of (1) or (2); heating the resulting reaction mixture at about 120° to 140° C for a period of about 1 to 2 hours; and recovering an imide polymer.

8. The process according to claim 7 in which equimolar amounts of 2,2'-bis(phenylethynyl)-5,5'-diaminobiphenyl and bis[4-(3,4-dicarboxyphenoxy)phenyl]sulfone dianhydride are mixed.

9. The process according to claim 7 in which equimolar amounts of 2,2'-bis(phenylethynyl)-5,5'-diaminobiphenyl and 2,2'-bis[4-(3,4-dicarboxyphenoxy)phenyl]hexafluoropropane dianhydride are mixed.

10. The process according to claim 7 in which equimolar amounts of 2,2'-bis(phenylethynyl)-4,4'-diaminobiphenyl and bis[4-(3,4-dicarboxyphenoxy)phenyl]sulfone dianhydride are mixed.

11. The process according to claim 7 in which equimolar amounts of 2,2'-bis(phenylethynyl)-4,4'-diaminobiphenyl and 2,2'-bis[4-(3,4-dicarboxyphenoxy)phenyl]hexafluoropropane dianhydride are mixed.

12. The process according to claim 7 in which equimolar amounts of 2,2'-bis(phenylethynyl)-4,4'-diaminobiphenyl and bis[4-(3,4-dicarboxyphenoxy)phenyl]sulfide dianhydride are mixed.

* * * * *